United States Patent
Finn

(10) Patent No.: US 10,400,715 B2
(45) Date of Patent: Sep. 3, 2019

(54) AIR FILTER WITH FLUTED MEDIA AND STAND-ALONE PREFORM SHELL

(71) Applicant: Caterpillar Inc., Peoria, IL (US)

(72) Inventor: Timothy S. Finn, Morton, IL (US)

(73) Assignee: Caterpillar Inc., Deerfield, IL (US)

( * ) Notice: Subject to any disclaimer, the term of this patent is extended or adjusted under 35 U.S.C. 154(b) by 392 days.

(21) Appl. No.: 15/360,759

(22) Filed: Nov. 23, 2016

(65) Prior Publication Data
US 2018/0142650 A1    May 24, 2018

(51) Int. Cl.
| | | |
|---|---|---|
| F02M 35/02 | (2006.01) | |
| B01D 46/52 | (2006.01) | |
| B01D 46/00 | (2006.01) | |
| F02M 35/024 | (2006.01) | |

(52) U.S. Cl.
CPC ..... *F02M 35/0202* (2013.01); *B01D 46/0002* (2013.01); *B01D 46/0005* (2013.01); *B01D 46/0015* (2013.01); *B01D 46/525* (2013.01); *F02M 35/0204* (2013.01); *F02M 35/024* (2013.01); *F02M 35/0205* (2013.01); *B01D 2279/60* (2013.01)

(58) Field of Classification Search
CPC ........................... B01D 46/525; B01D 46/527; B01D 46/0002; B01D 46/0005; B01D 2279/60; B01D 46/0015; F02M 35/0202; F02M 35/0204; F02M 35/02416; F02M 35/02483
See application file for complete search history.

(56) References Cited

U.S. PATENT DOCUMENTS

| | | |
|---|---|---|
| 3,884,658 A | 5/1975 | Roach |
| 5,275,636 A | 1/1994 | Dudley et al. |
| 5,472,463 A | 12/1995 | Herman et al. |
| 7,140,344 B2 | 11/2006 | Imanishi et al. |
| 8,778,043 B2 | 7/2014 | Krisko et al. |
| 2004/0060861 A1 | 4/2004 | Winter et al. |

(Continued)

FOREIGN PATENT DOCUMENTS

| | | |
|---|---|---|
| CN | 203403999 | 1/2014 |
| DE | 102004024435 | 12/2005 |
| EP | 1649920 | 4/2006 |

*Primary Examiner* — Robert Clemente
(74) *Attorney, Agent, or Firm* — Finnegan, Henderson, Farabow, Garrett & Dunner, LLP

(57) ABSTRACT

A stand-alone air filter assembly has a unitary molded plastic preform shell, with the preform shell including an inlet section, an outlet section, and a hose connection section integral with a downstream end of the outlet section. A filter media pack including a fluted filter media member is fitted inside the inlet section of the preform shell through which unfiltered air enters the air filter assembly. The outlet section of the preform shell through which filtered air leaves the air filter assembly converges from a larger, first cross-sectional area of the inlet section to a smaller, second cross-sectional area at the downstream end of the outlet section, and the outlet section includes one or more sensor ports that are each configured to support a sensor for measuring a characteristic of the filtered air leaving the air filter assembly. The hose connection section includes an annular hose bead interface formed around an outer circumference thereof for sealing engagement with a hose fluidly coupling the air filter assembly to an air intake on an engine.

20 Claims, 3 Drawing Sheets

(56) References Cited

U.S. PATENT DOCUMENTS

| | | | |
|---|---|---|---|
| 2007/0261662 A1* | 11/2007 | Lampert | B01D 46/10 |
| | | | 123/198 E |
| 2008/0016832 A1* | 1/2008 | Krisko | B01D 45/16 |
| | | | 55/342 |
| 2012/0011815 A1 | 1/2012 | Raether | |
| 2016/0030872 A1 | 2/2016 | Lin | |
| 2016/0045848 A1* | 2/2016 | Campbell | B01D 46/525 |
| | | | 55/357 |
| 2018/0369735 A1* | 12/2018 | Decoster | B01D 46/0023 |

* cited by examiner

AIR FILTER WITH FLUTED MEDIA AND STAND-ALONE PREFORM SHELL

TECHNICAL FIELD

The present disclosure relates generally to an air filter with fluted filter media and, more particularly, to an air filter with fluted filter media and a stand-alone preform shell.

BACKGROUND

In a combustion engine, air from the surrounding atmosphere is introduced to the engine to mix with fuel in the combustion chamber. Dirty and/or contaminated intake air may not only affect the engine performance, but also damage moving parts of the engine, resulting in increased maintenance costs and reduced life of the engine. To ensure the cleanliness of the intake air, an air cleaner is used to filter out dirt, debris, and other contaminants from the intake air.

Off-highway machines, such as, for example, tractors, wheel loaders, backhoe loaders, bulldozers, and excavators, and power-generating gensets (combinations of internal combustion engines and electric generators) operated on a temporary or permanent basis at various job sites are often exposed to harsh working environments with high concentrations of dust and debris. The air cleaners used in these applications must offer strength to withstand the vibrations expected in the machines and high dirt-holding capacity to adequately protect the engine for the desired service life of the filter elements. The air cleaners also must handle very high air flow, in some circumstances as high as 10,000 cubic feet per minute (CFM). Accordingly, these machines are equipped with a relatively large air cleaner capable of filtering dirt from such high air flows. In existing applications, an air cleaner may include an air filter element and a separate air filter housing for containing, supporting, and protecting the air filter element. The air filter element includes a filter media pack that can be replaced when the filter media becomes clogged with dust and debris. Typically the filter housing is a large external support structure with various mounting features for supporting the housing and serviceable air filter element on the engine and fluidly coupled to a compressor intake or other air intake on the engine. The filter housing for a high flow air cleaner is often a large and heavy metal structure that takes up a lot of the limited space on or around the engine.

One example of a straight through flow filter assembly is disclosed in U.S. Pat. No. 8,778,043 B2 ("the '043 patent") to Krisko et al. The filter assembly disclosed in the '043 patent includes a separate air cleaner housing and a filter cartridge that includes a filter media pack enclosed within a preformed molded plastic piece (preform). The preform and filter media pack are positioned within the interior volume of the air cleaner housing, and the preform secures the media pack inside of the air cleaner housing, with a housing seal secured between the housing portions. The filter media pack has first and second opposite flow faces and is constructed such that the air flows into the media pack through the first flow face and exits the media pack through the second flow face. The air cleaner requires a seal member forming a seal between the preform and the air cleaner housing in order to prevent dust and dirt from passing around the outside of the preform between the preform and the air cleaner housing without being filtered.

It may be desirable to provide an air filter assembly for high air flow applications associated with mobile or stationary engines without the need for a separate housing to support and contain the air filter assembly in fluid communication with the engines. An air filter assembly without the need for a separate air cleaner housing would reduce the number of parts required, facilitate installation and servicing of the air filter, and allow for the installation of a stand-alone air filter assembly in limited spaces. Various embodiments of the present disclosure may solve one or more of the problems and/or disadvantages discussed above.

SUMMARY

In one aspect, the present disclosure is directed to a stand-alone air filter assembly. The air filter assembly includes a unitary molded plastic preform shell, and the preform shell includes an inlet section, an outlet section, and a hose connection section integral with a downstream end of the outlet section. A filter media pack including a fluted filter media member is fitted inside the inlet section of the preform shell through which unfiltered air enters the air filter assembly. The outlet section of the preform shell through which filtered air leaves the air filter assembly converges from a larger, first cross-sectional area of the inlet section to a smaller, second cross-sectional area at the downstream end of the outlet section, and the outlet section includes one or more sensor ports each configured to support a sensor for measuring a characteristic of the filtered air leaving the air filter assembly. The hose connection section includes an annular hose bead interface formed around an outer circumference thereof for sealing engagement with a hose fluidly coupling the air filter assembly to an air intake on an engine.

In another aspect, the present disclosure is directed to a stand-alone high flow air filter configured to be mounted to an engine air intake without the need for a separate air cleaner housing containing the air filter and with an air flow capacity of greater than 2000 cubic feet per minute (CFM) of air flow. The air filter includes a unitary plastic protective preform shell, and the protective preform shell includes an inlet section, an outlet section, and a hose connection section integral with a downstream end of the outlet section. A fluted filter media pack is positioned in the inlet section of the protective preform shell and is configured to receive unfiltered air. The outlet section of the protective preform shell through which filtered air leaves the air filter converges from a larger, first cross-sectional area of the inlet section to a smaller, second cross-sectional area at the downstream end of the outlet section, and the outlet section includes one or more sensor ports each configured to support a sensor for measuring a characteristic of the filtered air leaving the air filter. The hose connection section includes an annular hose bead interface formed around an outer circumference thereof for sealing engagement with a hose fluidly coupling the air filter to an air intake on an engine.

In still another aspect, the present disclosure is directed to a method of manufacturing an air filter assembly. The method includes molding a unitary plastic preform shell, the preform shell including an inlet section, an outlet section, and a hose connection section integral with a downstream end of the outlet section. The inlet section of the preform shell is molded to have a substantially constant first cross-sectional area orthogonal to a central axis of the preform shell for an entire length of the inlet section from a first open end of the inlet section to the outlet section. The outlet section of the preform shell is molded to converge from the first cross-sectional area of the inlet section to a smaller, second cross-sectional area at the downstream end of the outlet section. The outlet section of the preform shell is further molded to include one or more sensor ports configured to support a sensor extending into an internal volume of the outlet section. The hose connection section of the preform shell is molded to include an annular hose bead interface formed around an outer circumference thereof for sealing engagement with a hose. The method also includes slidably inserting a fluted filter media pack into the first open end of the inlet section of the preform shell and retaining the fluted filter media pack in the inlet section by at least one of an adhesive provided between an outer peripheral portion of the filter media pack and an inner peripheral portion of the preform shell, and a seal provided between the filter media pack and the preform shell at the first open end of the inlet section.

DETAILED DESCRIPTION

Figure 1B:
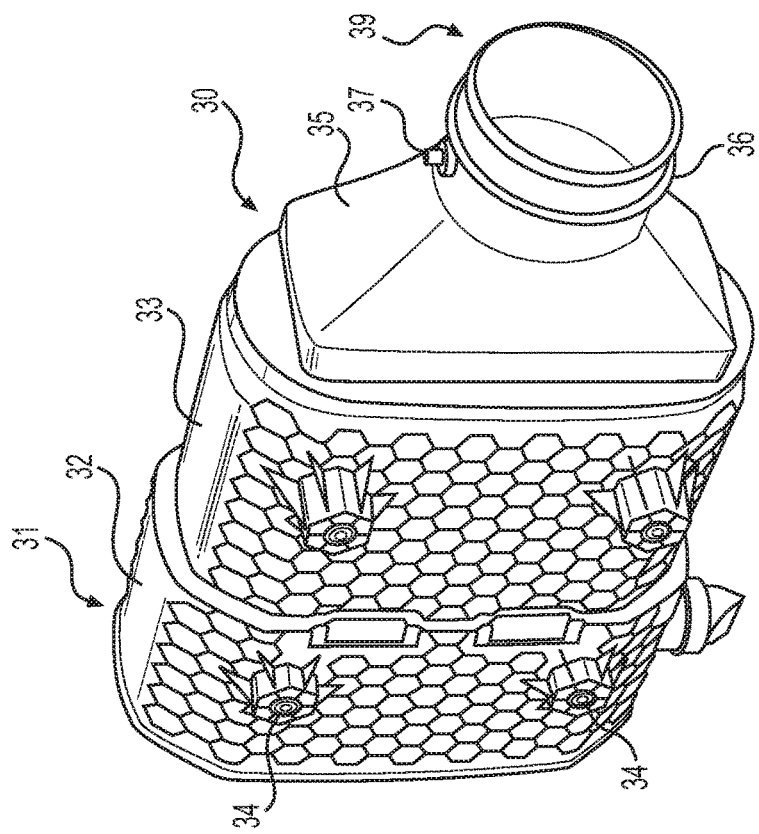
FIGS. 1A and 1B are perspective views of components of a conventional air cleaner assembly.
Figure 1A:
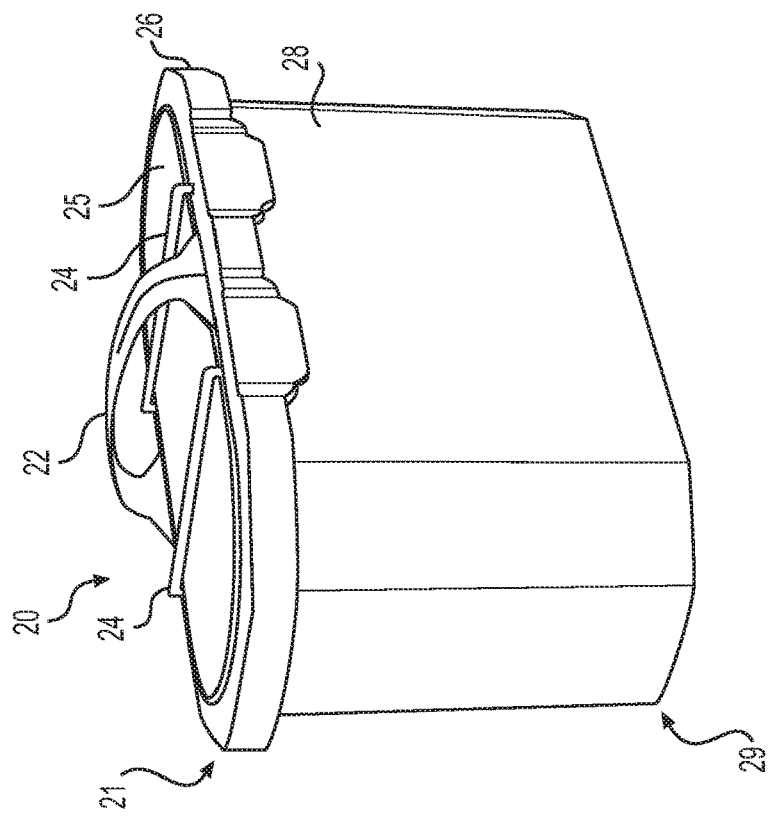
Figure 2:
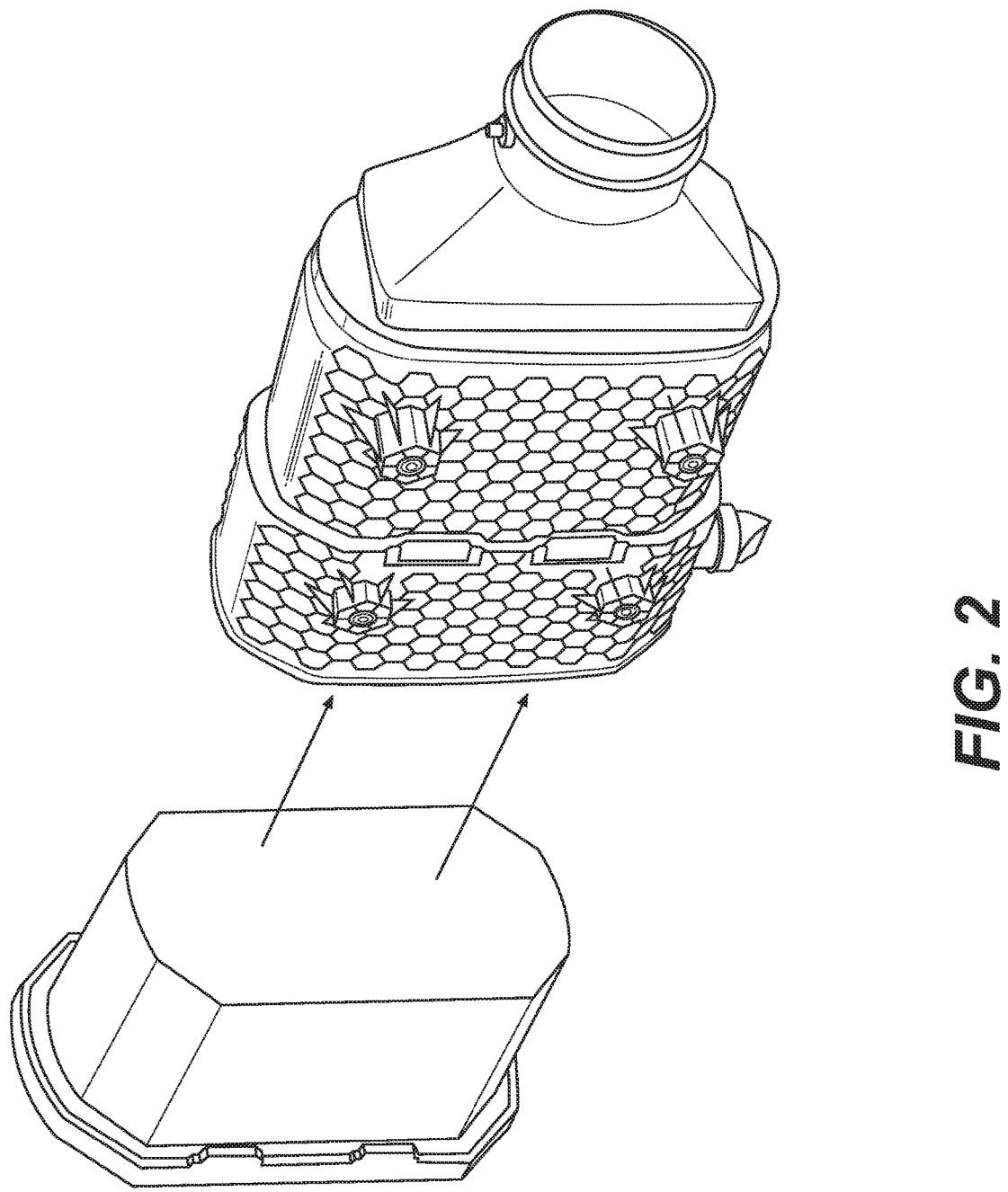
FIG. 2 is an exploded perspective view illustrating the assembly of the components of the conventional air cleaner assembly shown in FIGS. 1A and 1B.

FIGS. 1A and 1B illustrate a conventional air cleaner 20 and air cleaner housing 30. FIG. 2 illustrates the assembly of the conventional air cleaner 20 into the air cleaner housing 30 to form an air cleaner assembly. The air cleaner 20 includes a molded plastic preformed protective shell 28 (preform) that extends from a first inlet face 21 to an opposite outlet face 29. A filter media pack 25 is positioned within the shell 28, and held in place by a urethane seal around an upper extent of the filter media pack in the vicinity of a peripheral rim 26, as well as adhesive provided between the sides of the filter media pack 25 and the preform shell 28. Elements 24 are also provided across the upper extent of the filter media pack 25, extending between portions of the peripheral rim 26. A service handle 22 is also joined to opposite sides of the protective shell 28 at portions of the peripheral rim 26 at the inlet face 21 of the protective shell 28. The service handle 22 extends across the inlet face 21 and provides a means for grasping the air cleaner 20 and inserting and removing the air cleaner 20 into and out of the air cleaner housing 30.

The conventional air cleaner 20 is grasped by the service handle 22, and the preform protective shell 28 is aligned with a matching cavity extending into an inlet end 31 of the air cleaner housing 30. The air cleaner 20 is then be inserted into the matching cavity in the inlet end 31 of the housing 30 in the direction of the arrows shown in FIG. 2. When installed into the housing 30, the air cleaner 20 fills a first inlet section 32 of the housing 30. Filtered air leaving the filter media pack 25 of the air cleaner 20 then passes through an outlet section 33 with a converging portion 35 of the housing directing the filtered air into a hose connector 39 with hose bead 36. The converging portion 35 of the outlet section 33 may include one or more sensor ports 37 and/or bosses configured for supporting sensors that extend into an inner volume of the outlet section 33. The hose connector 39 is configured for fluidly connecting the air cleaner housing 30 to a hose or conduit coupled to an air intake of an engine. The air cleaner housing 30 for a high flow air filter, such as the air filters used on engines for large trucks or power generating plants, is generally a large and bulky metal structure that is mounted, for example, by mounts 34, on an engine or in an engine compartment in close proximity to an air intake for the engine.

Figure 3:
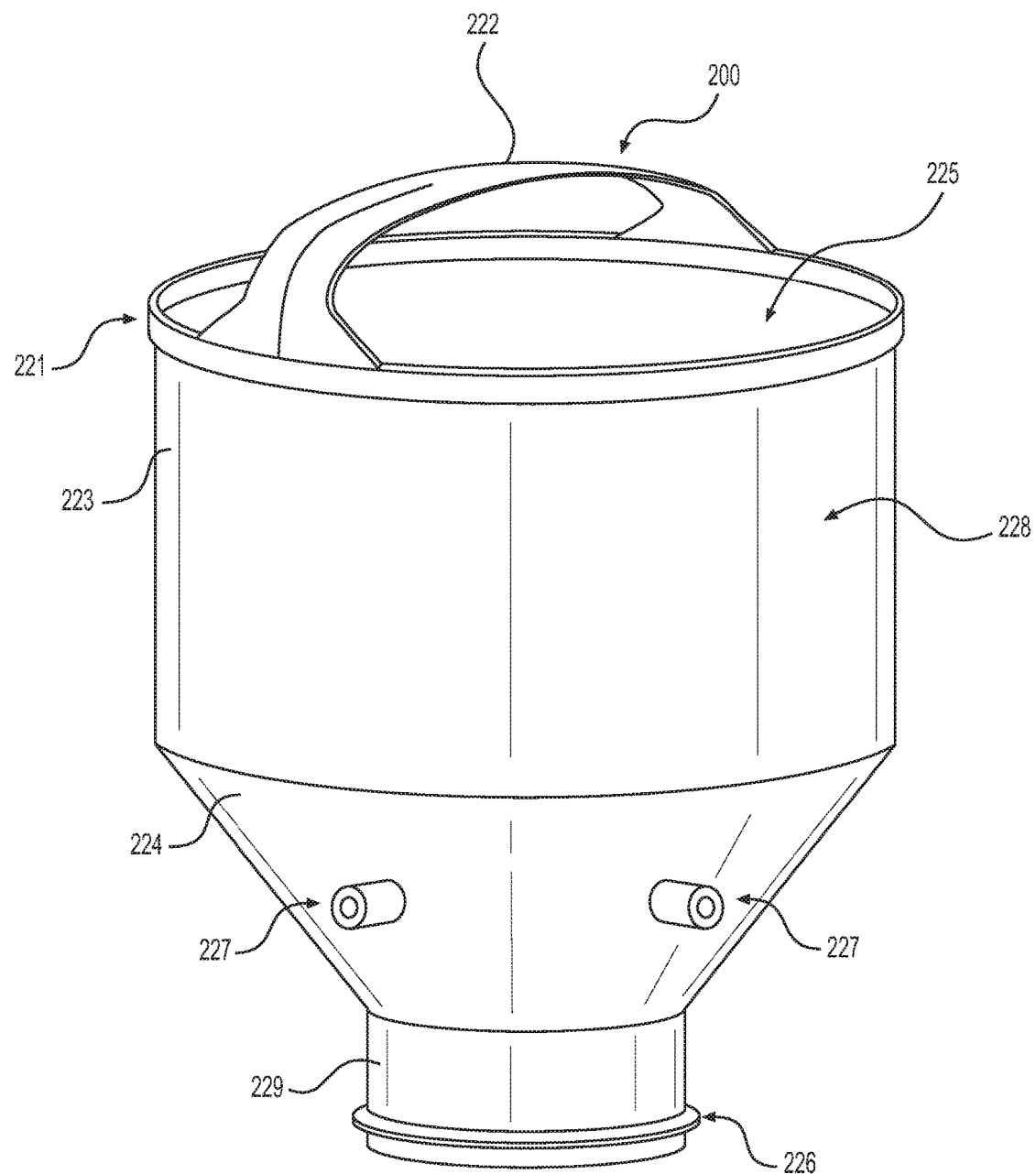
FIG. 3 is a perspective view of an air filter assembly according to one exemplary embodiment of the present disclosure.

In contrast to the conventional air cleaner assembly shown in FIGS. 1A, 1B, and 2, an exemplary embodiment according to this disclosure of a high flow air filter assembly 200 that does not require a separate housing is shown in FIG. 3. The air filter assembly 200 is a stand-alone high flow air filter configured to be mounted to an engine air intake without the need for a separate air cleaner housing containing the air filter and with an air flow capacity of greater than 2000 cubic feet per minute (CFM) of air flow.

An exemplary embodiment of an air filter assembly 200 according to this disclosure, as shown in FIG. 3, includes a plastic protective preform shell 228, which may be molded as a single unitary shell from plastic selected from a group of thermoplastic polymers including acrylonitrile butadiene styrene (ABS). The preformed molded plastic shell is referred to as the "preform" or the "preform shell". The preform shell 228 includes an inlet section 223, an outlet section 224, and a hose connection section 229 integral with a downstream end of the outlet section 224.

A fluted filter media pack 225 is positioned within the inlet section 223 of the protective preform shell 228, and is configured to receive unfiltered air into an inlet end of the fluted filter media pack. Fluted filter media is a filter media that has individual flutes (for example formed by corrugating or folding) extending thereacross. In some applications the fluted filter media may be corrugated media that includes corrugated sheets with a regular, curved, or wave pattern of flutes or corrugations. The filter media is a relatively flexible material, typically a non-woven fibrous material (of cellulose fibers, synthetic fibers or both) typically including a resin therein, and sometimes treated with additional materials.

The outlet section 224 of the protective preform shell 228 encloses a volume through which filtered air passes after leaving an outlet end of the fluted filter media pack 225 of the air filter positioned in the inlet section 223. The outlet section 224 converges from a larger, first cross-sectional area of the inlet section 223 to a smaller, second cross-sectional area at the downstream end of the outlet section 224. The outlet section also includes one or more sensor ports 227 and/or bosses, each configured to support a sensor for measuring a characteristic of the filtered air leaving the fluted filter media pack 225.

The outlet section 224 merges with the hose connection section 229, which is provided as an interface portion configured for fluidly coupling the preform shell 228 to a hose or conduit that directs the filtered air into an intake for the engine. The hose connection section 229 may include an annular hose bead interface 226 formed around an outer circumference thereof for sealing engagement with a hose or conduit fluidly coupling the air filter assembly 200 to the air intake on an engine. The air intake on an engine may include an air inlet of a compressor or a turbocharger configured to increase the pressure of ambient air before the air is introduced into combustion chambers of the engine.

In the exemplary embodiment illustrated in FIG. 3, the preform shell 228 is molded with the inlet section 223 of the preform shell 228 having a cylindrical-shaped body. In the illustrated exemplary embodiment, the entire length of the inlet section 223 has the same cross-sectional area taken in planes orthogonal to a central axis of the preform shell. One of ordinary skill in the art will recognize that other shapes and cross-sectional areas for the inlet section may be employed. Some variations from the cylindrical-shaped body include a rectangular-shaped body, a square-shaped body, an elliptical-shaped body, a body with other elongated, non-circular cross-sections, and combinations thereof with varying cross-sectional areas along the axial length of various portions of the preform shell 228. In some alternative embodiments, at least the inlet section 223 of the preform shell 228 may have an elongated, non-circular body configuration similar to the preform shell of the air filter shown in FIG. 1A. As shown in FIG. 3, a handle 222 may be joined to a rim portion 221 circumscribing the open end of the inlet section 223 of the protective preform shell 228, with the handle 222 extending across the inlet section 223.

The preform shell 228 may also include the outlet section 224 having a frustoconical shape extending from the downstream end of the inlet section 223 to the upstream end of the hose connection section 229. The cross-sectional area of the outlet section 224 may decrease continuously from a first cross-sectional area at the inlet section 223 to a smaller second cross-sectional area at the hose connection section 229. As with the inlet section 223 of the preform shell 228, alternative configurations may include the outlet section having other geometries including a plurality of substantially planar sections that taper inwardly from an upstream end to a downstream end to form a converging portion, similar to the converging outlet section 35 of the conventional air cleaner housing 30 illustrated in FIG. 1B. Advantages of forming the preform shell 228 with a cylindrical-shaped inlet section 223 merging with a frustoconical outlet section 224 include ease of manufacturing, a reduction in the amount of materials needed to form the preform shell, and increased cross-sectional area able to handle larger air flows in a smaller space than would be the case with elongated, non-circular cross-sectional areas. The outlet section 224 is also molded with one or more sensor ports 227 and/or bosses, which provide locations for mounting sensors that extend into the inner volume of the outlet section 224 to measure various characteristics of the filtered air leaving the fluted filter media in the inlet section 223. In some embodiments, the outlet section 224 may also be molded to include bosses extending from the sensor ports 227 and formed integrally with the preform shell. Examples of the types of sensors that may be mounted in the sensor ports 227 include pressure and temperature sensors.

The downstream end of the outlet section 224 merges into the hose connection section 229 of the protective preform shell, and in the exemplary embodiment illustrated in FIG. 3, the hose connection section 229 has a cylindrical shape. The hose connection section 229 may also be provided with the annular hose bead interface 226 formed around an outer circumference thereof for sealing engagement with a hose fluidly coupling the air filter assembly to an air intake on an engine.

A method of manufacturing an air cleaner assembly according to the various exemplary embodiments of this disclosure is described in the following section.

INDUSTRIAL APPLICABILITY

The disclosed stand-alone air filter assembly according to various exemplary embodiments of this disclosure may be applicable to various air cleaners used in machines, including various off highway work machines, such as, for example, tractors, wheel loaders, backhoe loaders, bulldozers, and excavators, and machines such as the gensets used in permanent or temporary power generating plants. The stand-alone air filter assembly includes a fluted filter media pack enclosed within an inlet section of a molded plastic protective preform shell, and can be mounted to an engine without the need for a separate air filter housing. As a result, the disclosed air filter assembly reduces the total number of parts required to provide an air filter in association with an engine, facilitates installation and servicing of the air filter, and allows for the installation of a stand-alone air filter assembly in limited spaces that would not allow for the installation of a separate air filter housing.

A method of manufacturing the air filter assembly according to various exemplary embodiments of this disclosure may include molding the unitary plastic preform shell 228, with the preform shell including an inlet section 223, an outlet section 224, and a hose connection section 229 integral with a downstream end of the outlet section 224. The plastic molded preform shell 228 may be formed from a molded plastic selected from a group of thermoplastic polymers including acrylonitrile butadiene styrene (ABS).

The inlet section of the preform shell 228 may be molded to have a substantially constant cross-sectional area orthogonal to a central axis of the preform shell for an entire axial length of the inlet section 223 from a first open end of the inlet section to the outlet section 224. The outlet section 224 of the preform shell 228 may be molded to converge from a first cross-sectional area at the downstream end of the inlet section 223 to a smaller, second cross-sectional area at the downstream end of the outlet section 224. The outlet section 224 of the preform shell 228 may also be molded to include one or more sensor ports 227 and/or sensor mounting bosses configured to support a sensor extending into an internal volume of the outlet section 224. The downstream end of the outlet section 224 merges into the hose connection section 229 of the preform shell 228. The hose connection section 229 may be molded to include the annular hose bead interface 226 formed around an outer circumference thereof for engagement with a hose.

After the preform shell 228 has been molded, cooled, and subjected to any post-molding processing steps required, such as machining to remove mold flashings or to create additional features that may be desired, a fluted filter media pack is inserted into the first open end of the inlet section 223 of the preform shell 228. In some embodiments, retaining elements (not shown) may be joined to the rim portion 221 at the upstream end of the inlet section 223, extending across the first open end of the inlet section if desirable or necessary for retaining the fluted filter media pack 225 in the inlet section 223. The filter media pack 225 may also be retained within the preform shell 228 by a urethane seal provided between an outer peripheral portion of an upper extent of the filter media pack 225 and an inner peripheral portion of the preform shell 228 in the vicinity of the rim portion 221. Additionally, an adhesive may be provided between at least a portion of the outer periphery of the filter media pack 225 and an inner periphery of the inlet section 223 of the preform shell 228.

As discussed above, the unitary molded plastic preform shell 228 may be molded with the inlet section 223 being cylindrical in shape, the outlet section 224 being frustoconical in shape, and the hose connection section 229 being cylindrical in shape. Other shapes and cross-sectional areas along the axial length of the preform shell 228 may also be employed, depending on factors that may include ease of manufacturability, costs of materials, space constraints where the air filter assembly will be installed, and air flow capacity required for the air filter assembly.

It will be apparent to those skilled in the art that various modifications and variations can be made to the disclosed stand-alone air filter assembly. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A stand-alone air filter assembly comprising:
a unitary molded plastic preform shell, the preform shell including an inlet section, an outlet section, and a hose connection section integral with a downstream end of the outlet section; and
a filter media pack, the filter media pack including a fluted filter media member fitted inside the inlet section of the preform shell through which unfiltered air enters the air filter assembly, the filter media pack being retained within the inlet section of the preform shell by an adhesive provided between an outer peripheral portion of the filter media pack and an inner peripheral portion of the preform shell and a urethane seal provided between an outer peripheral portion of an upper extent of the filter media pack and an inner peripheral portion of the preform shell in a vicinity of a rim portion of the preform shell circumscribing an open end of the inlet section;
the outlet section of the preform shell through which filtered air leaves the air filter assembly converging from a larger, first cross-sectional area of the inlet section to a smaller, second cross-sectional area at the downstream end of the outlet section, the outlet section including one or more sensor ports and bosses extending from the sensor ports and formed integrally with the preform shell, wherein each of the bosses is configured to support a sensor for measuring a characteristic of the filtered air leaving the air filter assembly; and
the hose connection section including an annular hose bead interface formed around an outer circumference thereof for sealing engagement with a hose fluidly coupling the air filter assembly to an air intake on an engine.

2. The stand-alone air filter assembly of claim 1, wherein the inlet section of the preform shell has a cylindrical body.

3. The stand-alone air filter assembly of claim 1, wherein the inlet section of the preform shell has an elongated, non-cylindrical body.

4. The stand-alone air filter assembly of claim 1, further including a handle joined to the inlet section of the preform shell.

5. The stand-alone air filter assembly of claim 2, wherein the outlet section includes a frustoconical-shaped portion of the preform shell extending from the first cross-sectional area to the second cross-sectional area.

6. The stand-alone air filter assembly of claim 5, wherein the hose connection section of the preform shell is cylindrical in shape.

7. The stand-alone filter assembly of claim 3, wherein the outlet section includes a plurality of substantially planar side walls that taper inwardly from the inlet section to the hose connection section.

8. The stand-alone filter assembly of claim 1, wherein the one or more sensor ports in the outlet section include at least one of a pressure sensor and a temperature sensor.

9. The stand-alone filter assembly of claim 1, wherein the protective preform shell is formed from a thermoplastic polymer.

10. A stand-alone high flow air filter configured to be mounted to an engine air intake without the need for a separate housing containing the air filter and with an air flow capacity of greater than 2000 cubic feet per minute (CFM) of air flow, the air filter comprising:
a unitary plastic protective preform shell, the protective preform shell including an inlet section, an outlet section, and a hose connection section integral with a downstream end of the outlet section;
a fluted filter media pack;
the inlet section of the protective preform shell being configured to receive unfiltered air into the fluted filter media pack positioned inside the inlet section of the protective preform shell, the filter media pack being retained within the inlet section of the preform shell by an adhesive provided between an outer peripheral portion of the filter media pack and an inner peripheral portion of the preform shell and a urethane seal provided between an outer peripheral portion of an upper extent of the filter media pack and an inner peripheral portion of the preform shell in a vicinity of a rim portion of the preform shell circumscribing an open end of the inlet section;
the outlet section of the protective preform shell through which filtered air leaves the air filter converging from a larger, first cross-sectional area of the inlet section to a smaller, second cross-sectional area at the downstream end of the outlet section, the outlet section including one or more sensor ports and bosses extending from the sensor ports and formed integrally with the preform shell, wherein each of the bosses is configured to support a sensor for measuring a characteristic of the filtered air leaving the air filter; and
the hose connection section including an annular hose bead interface formed around an outer circumference thereof for sealing engagement with a hose fluidly coupling the air filter to an air intake on an engine.

11. The air filter of claim 10, wherein the inlet section of the protective preform shell has a cylindrical body.

12. The air filter of claim 10, wherein the inlet section of the protective preform shell has an elongated, non-circular body.

13. The air filter of claim 10, further including a handle joined to the inlet section of the protective preform shell.

14. The air filter of claim 13, wherein the outlet section includes a frustoconical-shaped portion of the protective preform shell extending from the first cross-sectional area to the second cross-sectional area.

15. The air filter of claim 14, wherein the hose connection section of the protective preform shell is cylindrical in shape.

16. The air filter of claim 3, wherein the outlet section includes a plurality of substantially planar side walls that taper inwardly from the inlet section to the hose connection section.

17. The air filter of claim 10, wherein the one or more sensor ports in the outlet section include at least one of a pressure sensor and a temperature sensor.

18. The air filter of claim 10, wherein the protective preform shell is formed from acrylonitrile butadiene styrene (ABS).

19. A method of manufacturing an air filter assembly, the method comprising:
molding a unitary plastic preform shell, the preform shell including an inlet section, an outlet section, and a hose connection section integral with a downstream end of the outlet section;
the inlet section of the preform shell being molded to have a substantially constant first cross-sectional area orthogonal to a central axis of the preform shell for an entire length of the inlet section from a first open end of the inlet section to the outlet section;

the outlet section of the preform shell being molded to converge from the first cross-sectional area of the inlet section to a smaller, second cross-sectional area at the downstream end of the outlet section;

the outlet section of the preform shell further being molded to include one or more sensor ports and bosses extending from the sensor ports and formed integrally with the preform shell, wherein each of the bosses is configured to support a sensor extending into an internal volume of the outlet section;

the hose connection section of the preform shell being molded to include an annular hose bead interface formed around an outer circumference thereof for sealing engagement with a hose; and slidably inserting a fluted filter media pack into the first open end of the inlet section of the preform shell and retaining the fluted media pack in the inlet section by an adhesive provided between an outer peripheral portion of the filter media pack and an inner peripheral portion of the preform shell, and a urethane seal provided between an outer peripheral portion of an upper extent of the filter media pack and an inner peripheral portion of the preform shell at the first open end of the inlet section in a vicinity of a rim portion of the preform shell circumscribing the first open end of the inlet section.

20. The method of claim 19, wherein the unitary plastic preform shell is molded with the inlet section being cylindrical in shape, the outlet section being frustoconical in shape, and the hose connection section being cylindrical in shape.

* * * * *